United States Patent Office 3,444,225
Patented May 13, 1969

3,444,225
ORGANOPOLYSILOXANES, THEIR PREPARATION AND THEIR USES
Jean Boissieras and Marcel Lefort, Lyon, France, assignors to Rhone-Poulenc S.A., Paris, France, a corporation of France
No Drawing. Filed May 10, 1965, Ser. No. 454,675
Claims priority, application France, May 20, 1964, 975,134, Patent 1,404,561
Int. Cl. C07f 7/02
U.S. Cl. 260—448.2                     5 Claims

ABSTRACT OF THE DISCLOSURE

The invention provides new polysiloxanes in which each terminal silicon atom has two hydrogen atoms attached thereto. These new polysiloxanes are useful as waterproofing and anti-adhesion agents.

---

The present invention relates to organopolysiloxane derivatives and their preparation.

French Patent No. 941,296 describes compounds of the formula:

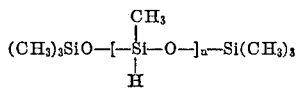

in which $n$ represents an integer at least equal to 1. These compounds are stated to be produced by condensing together the products of hydrolysis of a monomethyldihalogenosilane and trimethylmonohalogenosilane.

In French Patent No. 970,424 compounds of the formula:

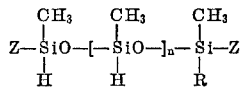

in which Z represents a lower alkyl radical or a halogen atom, R represents a hydrogen atom or a lower alkyl radical, and $n$ is equal to 0 or 1, are described. They are prepared by reacting a Grignard reagent with the product of hydrolysis of methyldichlorosilane, or by reacting an alkyl dichlorosilane with the product of hydrolysis of methyldichlorosilane.

Madaras [Journal of the Society of Dyers and Colourists, December 1958, p. 836] mentions the compounds of the formula:

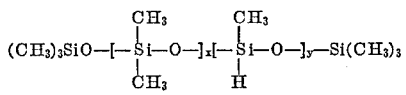

in which $x$ and $y$ are positive integers, as suitable for use in the formation of waterproof coatings.

All these compounds contain a variable number of hydrogen-silicon bonds, and no silicon atom is bound to more than one hydrogen atom.

The present invention provides new linear organopolysiloxanes, having a wide range of viscosities, of which each molecule contains a total of four hydrogen atoms attached to silicon, the said hydrogen atoms being bound in pairs to the terminal silicon atoms of the siloxane chain. These compounds have the formula:

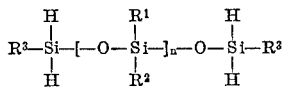           I in which the symbols $R^1$, $R^2$, and $R^3$ are the same or different and are each saturated or unsaturated aliphatic hydrocarbon radicals, saturated or unsaturated cycloaliphatic hydrocarbon radicals, or aryl radicals, including substituted such radicals, and $n$ is a positive integer. The compounds of Formula I differ from the known compounds previously mentioned, first, in that the only silicon atoms carrying hydrogen atoms are the silicon atoms at the ends of the chain, and, secondly, in that these silicon atoms carry two hydrogen atoms each and not one.

The compounds of Formula I are prepared in accordance with the invention by reacting a compound of the formula:

           II in which X represents a hydrolysable atom or group, and $R^3$ is as hereinbefore defined, with an $\alpha,\alpha$-dihydroxylated diorganopolysiloxane, of the formula:

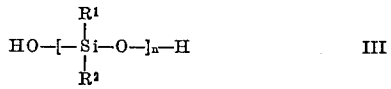           III in which $R^1$, $R^2$ and $n$ are as hereinbefore defined.

As examples of the groups $R^1$, $R^2$ and $R^3$ may be mentioned, alkyl radicals of 1 to 4 carbon atoms, alkenyl radicals of 1 to 4 carbon atoms, more particularly vinyl and allyl radicals, saturated and monoethylenically unsaturated cycloaliphatic radicals of 5 to 6 carbon atoms, such as cyclopentyl, cyclohexyl or cyclohexenyl, phenyl radicals, and mono- and di-alkylphenyl radicals in which each alkyl contains 1 to 4 carbon atoms such as tolyl, xylyl or cumenyl, phenylalkyl radicals in which the alkyl radical contains 1 to 4 carbon atoms, such as benzyl and phenylethyl. The symbols $R^1$, $R^2$ and $R^3$ may also represent a monovalent hydrocarbon radical, such as one of those mentioned, in which one or more hydrogen atoms have been replaced by functional atoms or groups which do not react, or substantially do not react, under the conditions of preparation of the compounds of Formula I. As examples of such functional atoms and groupings, may be mentioned the halogen atoms, more especially chlorine and fluorine, and the cyano radical. Thus, $R^1$, $R^2$ and $R^3$ may represent, for example, radicals such as chloro- or fluoro-methyl, monochloro-, monobromo- or monofluorophenyl, or chlorocyclohexyl.

$n$ represents an integer at least equal to 1, and may, for example, be small, e.g. 1 to 5 or large, up to e.g. as high as 700. Its upper limit may vary a little with the nature of the radicals $R^1$ and $R^2$ in the compound of Formula III, as it is an essential requirement that this compound should be sufficiently fluid, or should give a dispersion sufficiently fluid, to be able to react with the compound of Formula II.

X represents any hydrolysable atom or group which gives a compound HX having an acidic or basic reaction. As examples may be mentioned, more particularly, chlorine and acyloxy groups (which give compounds HX having an acidic reaction) and the amino group (which gives a compound HX having a basic reaction). Preferred acyloxy groups are the alkanoyloxy groups containing up to 4 carbon atoms, such as acetoxy and propionyloxy.

The compounds of the Formulae II and III are known and their preparation is described in the literature.

The compounds of Formula II in which X is chlorine may be prepared, as is known, by disproportionation, in the presence of a catalyst, of the corresponding monohydrogenated dichlorosilanes, which are obtained in the preparation of organo-chlorosilanes by the action of alkyl chlorides on silicon. Preferred compounds of Formula II are monomethylmonochlorosilane, monoethylmonochlorosilane, monomethylmonoacetoxysilane, and monophenylmonoacetoxysilane.

The compounds of Formula III may be prepared by hydrolysis of bi-functional silanes, more particularly by hydrolysis of diorganodichlorosilanes, and condensation of the products of hydrolysis, i.e. preferably from cyclic diorganopolysiloxanes as described, for example, in United States Patent No. 2,843,555. The catalyst employed in these polymerisation operations is neutralised at the end of the operation, and the product of this neutralisation may be left in the compound of Formula III without in any way interfering with the preparation of the compound of Formula I, or its stability or use.

The reaction between the compounds of Formulae II and III takes place spontaneously on mixing of the reactants. Theoretically, two molecules of the compound of Formula II are required for each molecule of compound of Formula III, but in practice it may be more advantageous to operate with an excess of the compound of Formula II.

The reaction may be carried out with or without a diluent. It is often advantageous to use a diluent either to increase the fluidity of the reaction medium or, where desired, to dissolve the compound of Formula II when the latter is too volatile, or normally gaseous, at ambient temperature. When the compound of Formula II is gaseous, the operation may be carried out either at a temperature such that the compound is liquid, or, as previously stated, using a solution of this compound. As diluent, any organic compound which is inert under the operating conditions, and which is inert under the operating conditions, and which is capable of increasing the fluidity of the medium, may be used. More particularly, the following may be employed: optionally halogenated benzene hydrocarbons, such as benzene, toluene, xylene, and monochlorobenzene, petroleum ether, white spirit, halogenated derivatives of aliphatic hydrocarbons such as trichloroethylene and tetrachloroethylene, and ethers, mainly aliphatic ethers such as diethyl ether, dipropyl ether, and dibutyl ether. A single solvent of one particular type or mixtures of solvents of the same or different types may be employed.

The reaction between the compounds of Formulae II and III may take place over a range of temperatures and in some circumstances it may be necessary or desirable to cool the reaction mixture. Consequently, depending upon the volatility of the compound of Formula II and upon the precise reaction conditions, it may be possible to operate at ambient temperature (20° C.) or at elevated temperature up to 100° C., or at low temperatures, e.g. down to −50° C., if at this temperature the reaction medium is sufficiently fluid.

When the compound of formula HX which is formed in the reaction is sufficiently volatile under the operating conditions, more particularly when X is chlorine, it can readily be eliminated (as gas or vapour) as it is formed. However, when the compound HX is volatile under the operating conditions, if it is an acid, it may be advantageous to neutralise it in situ with an inorganic or organic compound capable of reacting with the liberated acid, but inert to the organosilicon compounds involved in the process. Thus, inorganic compounds such as calcium carbonate or magnesia, but preferably, tertiary amines, more particularly trialkylamines in which each alkyl radical contains from 1 to 4 carbon atoms, such as triethylamine, tripropylamines, and tributyl amines, derivatives of aromatic amines such as dimethylaniline, and tertiary heterocyclic amines such as pyridine and its various alkyl derivatives, such as lutidines and picolines, may be employed. This neutralisation agent is employed in a quantity equivalent to the quantity of acid HX produced in the reaction, or in a moderate excess.

At the end of the operation, the compound of Formula I free or substantially free from the product HX is obtained directly if it has been possible to eliminate the latter product as it is formed. Alternatively a mixture of the compound of Formula I and of the product HX or a neutralisation derivative thereof is obtained. In the latter case, the product of Formula I may be separated by any approprite means, such as filtration, distillation, washing with water, or solvent extraction.

It is to be understood that a compound of Formula III may be reacted either with a single compound of Formula II, which gives a compound of Formula I whose end groups are identical, or with a mixture of compounds of Formula II, which gives rise to a mixture of compounds of Formula I some of the molecules of which have different ends.

The compounds of Formula I in which $n$ is a small integer may readily be obtained in the pure state, but the compounds in which $n$ is large are generally mixtures of compounds having different values of $n$. It is also to be understood that the compounds of Formula I may contain different units of formula:

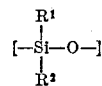

and may be derived from mixtures of different compounds of Formula III. For example, the compound of Formula III may be a mixture of dimethylpolysiloxane and of diphenylpolysiloxane, and each of these compounds may itself be a mixture of molecules having different values of $n$.

The compounds of Formula I in which $n$ is a small integer or colourless and relatively mobile liquids. The viscosity of the compounds increases as $n$ increases, and when $n$ is high, the compounds are highly viscous oils. They are stable in the ambient air, even at elevated temperatures not substantially exceeding 100° C. They may advantageously replace the known compounds having hydrogen-silicon bonds as waterproofing and anti-adhesion agents. They are thus very suitable for waterproofing textiles such as cotton and wool, and for the formation of anti-adhesion coatings on paper. The compounds of Formula I may also be employed as intermediates for the preparation of other compounds. They constitute, the example, starting materials of well-defined structure for the preparation of tetrafunctional organopolysiloxanes which can be converted into elastic solids.

The following examples illustrate the invention and show how it can be put into practice.

Example 1

Into a round-bottomed flask, provided with a mechanical stirrer, a condenser and a dropping funnel, are introduced 108 g. of diphenylsilanediol, 111 g. of triethylamine and 1,000 cc. of anhydrous diethyl ether. A clear solution is obtained. The flask is swept out by a current of dry nitrogen, while the apparatus is cooled to 0° C., with a mixture of acetone and solid carbon dioxide. A solution of 84 g. monomethylmonochlorosilane in 100 cc. of anhydrous diethyl ether previously cooled to −10° C. is run in with rapid stirring, and the contents of the flask are then allowed to heat up to ambient temperature. The triethylamine hydrochloride precipitate is separated by filtration.

The remaining liquid is then distilled under normal pressure to eliminate the ether and then in vacuo. 120 g. of a colourless liquid which boils between 108° and 109° C. under 1.1 mm. Hg, are thus obtained which is 1,5 - dimethyl-1,1,5,5-tetrahydrogeno-3,3-diphenyltrisiloxane, $n_D^{20}=1.5140$, $d_4^{20}=1.021$.

Example 2

Proceeding as in Example 1, but replacing the diphenylsilanediol by 83 g. tetramethyldisiloxanediol, 1,1,7,7-tetrahydrogeno-1,3,3,5,5,7-hexamethyltetrasiloxane, which is a liquid boiling at 52–53° C. under an absolute pressure of 14 mm. Hg, is finally obtained $n_D^{20}=1.3846$, $d_4^{20}=0.869$.

Example 3

Into the apparatus described in Example 1 are charged: (a) 500 g. of a dimethylpolysiloxane oil having a viscosity of 33 centistokes at 25° C., and consisting of a mixture of α,ω-dihydroxylated linear dimethyl polysiloxanes and cyclic siloxanes (4.5% of the weight of oil), the hydroxyl group attached to the terminal silicon atoms representing 4.8% of the weight of oil; (b) 109 g. of pyridine; and (c) 1,500 cc. of anhydrous diethyl ether.

The contents of the flask are cooled to 0° C. and, with stirring, a solution of 148 g. of monomethylmonochlorosilane in 200 cc. of diethyl ether cooled to −10° C. is run-in in one hour. The pyridine hydrochloride formed is separated by filtration and the ether is driven off by distillation. A clear oil is obtained, from which the volatile constituents are eliminated by heating under 0.2 mm. Hg. The percentage of hydrogen attached to silicon (viz 0.56%) indicates that the oil obtained corresponds on average to the formula:

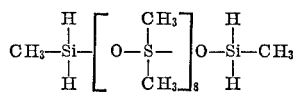

This oil may be employed to waterproof textiles.

The oil employed as starting material may be prepared by hydrolysis of dimethyldiacetoxysilane with water, followed by heating at 50° C. under pressure of 10 mm. Hg, to eliminate the greater part of the volatile products.

Example 4

Proceeding as in Example 1, a solution of 1000 g. of an α,ω-dihydroxylated dimethylpolysiloxane oil having a viscosity of 505 centistokes at 25° C. (OH%=0.35), containing no volatile compounds, with 22.5 g. of triethylamine in 1 litre of diethyl ether is reacted at 0° C. with 25 g. of monomethylmonochlorosilane. The methylchlorosilane, which has been cooled below 0° C., is added in 5 minutes without previous dilution. The contents of the flask are then allowed to heat up to ambient temperature, and the liquid obtained is brought to the reflux temperature of the ether for 3 hours. Finally, the amine hydrochloride is separated by filtration and the ether is distilled off. A clear oil having a viscosity of 450 centistokes at 25° C., is thus obtained in which the percentage of hydrogen attached to silicon is 0.04%, indicating that the product obtained corresponds on average to the formula:

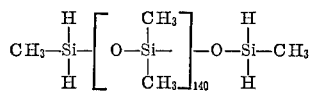

The dimethylpolysiloxane oil employed as starting material may be prepared by heating 5,000 g. of octamethylcyclotetrasiloxane for half an hour at 160° C. with 50 mg. of potassium hydroxide, which gives an oil of high viscosity, to which water vapour is added, while the temperature is maintained for four hours. After neutralisation, the volatile products are driven off and the oil cooled, while a current of nitrogen is passed therethrough.

Example 5

The procedure of Example 4 is followed, but the dimethylpolysiloxane oil of 505 centistokes viscosity is replaced by 500 g. of a dimethylpolysiloxane oil having a viscosity of 5250 centistokes at 25° C., free from volatile constituents, and having a percentage of hydroxyls attached to silicon of 0.15. In this reaction the monomethylmonochlorosilane (10 g.) is diluted with 20 cc. of ether, and this solution, cooled to 0° C., is added in 5 minutes. The final oil obtained after purification has a viscosity of 5200 centistokes at 25° C., and contains 0.017% of hydrogen attached to silicon which corresponds to the average formula:

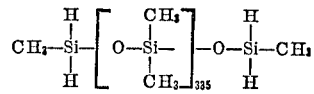

The dimethylpolysiloxane oil employed as starting material is obtained, like that of Example 4, from octamethylcyclotetrasiloxane, by a procedure similar to that of Example 4.

Example 6

Into a two-litre round-bottomed flask equipped as described in Example 1 are introduced 200 g. of tetraphenyldisiloxanediol, 108 g. of triethylamine and 800 cc. of toluene, and the mixture is then cooled to −3° C. with a mixture of acetone and solid carbon dioxide. A solution of 100 g. of monomethylmonochlorosilane in 200 cc. of toluene is added during 30 minutes with stirring, and the mixture is then allowed to heat up to ambient temperature.

The triethylamine hydrochloride precipitate formed is dissolved by adding a solution of dilute hydrochloric acid (pH 3), and the organic phase is then separated washed with water, and dried over anhydrous sodium sulphate. After the toluene ha sbeen distilled off 92.5 g. of a colourless liquid boiling between 184° and 186° C. under 0.4 mm. Hg are obtained which is 1,7-dimethyl-1,1,7,7 - tetrahydrogeno - 3,3,5,5 - tetraphenyltetrasiloxane- $n_D^{20}=1.5548$, $d_4^{20}=1.094$.

Example 7

Into a three-litre, round-bottomed flask equipped as in Example 1, are introduced 960 g. of an α,ω-dihydroxylated methylphenylpolysiloxane oil having a mole ratio of phenyl to methyl equal to 1:1 and a viscosity of 5200 centistokes at 25° C. (OH%=0.13), 20 g. of triethylamine and 750 cc. of anhydrous diethyl ether. A solution of 20 g. of monomethylmonochlorosilane in 50 cc. of anhydrous ether, cooled to −30° C., is added during ten minutes, the reaction mixture being maintained at a temperature in the neighbourhood of −10° C. The mixture is then allowed to heat up to ambient temperature, diluted with 3000 cc. of diethyl ether, and washed to neutrality with water.

The ether is distilled off and a clear solution is obtained from which the volatile constituents are eliminated by heating under 0.2 mm. Hg. 915 g. of oil possessing a viscosity of 5570 centistokes at 20° C. are thus obtained. The percentage of hydrogen attached to silicon (viz 0.016%), indicates the following average formula for the oil:

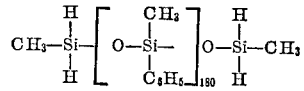

Example 8

Into the apparatus of Example 1 are introduced: 200 g. of a dimethylpolysiloxane oil having a viscosity of 567 centistokes at 20° C. (OH%=0.36); 6 g. of triethylamine; and 200 cc. of anhydrous diethyl ether; 6 g. of monobutylmonochlorosilane are then added with stirring during a few minutes at ambient temperature. The mixture is stirred for two hours at ambient temperature and then refluxed for two hours. After cooling, the mixture is worked up as in Example 7.

The oil obtained (199 g.) has a viscosity of 513 centistokes at 20° C., and in it the percentage of hydrogen attached to silicon (viz 0.043%), indicates a product of average formula,

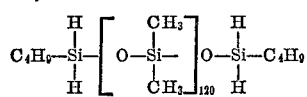

We claim:
1. An organopolysiloxane of the formula:

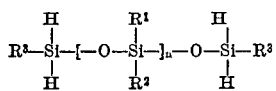

in $R^1$ and $R^2$ are each members selected from the class consisting of alkyl of 1 to 4 carbon atoms and phenyl, $R^3$ is alkyl of 1 to 4 carbon atoms, and $n$ is an integer from 1 to 700.

2. An organopolysiloxane as claimed in claim 1 in which $R^1$ and $R^2$ are each members selected from the class consisting of methyl and phenyl, and $R^3$ is methyl.

3. 1,5 - dimethyl - 1,1,5,5 - tetrahydrogeno - 3,3 - diphenyltrisiloxane.
4. 1,1,7,7 - tetrahydrogeno - 1,3,3,5,5,7 - hexamethyltetrasiloxane.
5. 1,7 - dimethyl - 1,1,7,7 - tetrahydrogeno - 3,3,5,5-tetraphenyltetrasiloxane.

References Cited
UNITED STATES PATENTS
2,823,218  2/1958  Speier et al. _____ 260—448.2
2,877,256  3/1959  Clark et al. _____ 260—448.2

TOBIAS E. LEVOW, *Primary Examiner.*

J. P. PODGORSKI, *Assistant Examiner.*

U.S. Cl. X.R.

106—13; 117—143, 152